(12) United States Patent
Bobar et al.

(10) Patent No.: US 11,040,489 B2
(45) Date of Patent: Jun. 22, 2021

(54) ADDITIVE MANUFACTURING APPARATUS

(71) Applicant: GENERAL ELECTRIC COMPANY, Schenectady, NY (US)

(72) Inventors: Adnan Bobar, Birr (CH); Jan Schwerdtfeger, Baden (CH); Juan Vicente Haro, Birr (CH); Archie Swanner, Jr., Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 783 days.

(21) Appl. No.: 15/788,037

(22) Filed: Oct. 19, 2017

(65) Prior Publication Data

US 2019/0118468 A1    Apr. 25, 2019

(51) Int. Cl.
| | | |
|---|---|---|
| *B29C 64/245* | (2017.01) | |
| *B29C 64/357* | (2017.01) | |
| *B22F 3/24* | (2006.01) | |
| *B33Y 30/00* | (2015.01) | |
| *B33Y 40/00* | (2020.01) | |
| *B33Y 10/00* | (2015.01) | |
| *B22F 12/00* | (2021.01) | |
| *B29C 64/241* | (2017.01) | |
| *B29C 64/35* | (2017.01) | |
| *B29C 64/268* | (2017.01) | |
| *B22F 10/10* | (2021.01) | |

(Continued)

(52) U.S. Cl.
CPC .............. *B29C 64/245* (2017.08); *B22F 3/24* (2013.01); *B22F 12/00* (2021.01); *B29C 64/241* (2017.08); *B29C 64/268* (2017.08); *B29C 64/35* (2017.08); *B29C 64/357* (2017.08); *B33Y 10/00* (2014.12); *B33Y 30/00* (2014.12); *B33Y 40/00* (2014.12); *B22F 3/10* (2013.01); *B22F 10/10* (2021.01); *B22F 2003/247* (2013.01); *B29C 64/153* (2017.08); *B29C 64/25* (2017.08)

(58) Field of Classification Search
CPC ........ B22F 3/1055; B22F 3/24; B29C 64/245; B29C 64/357; B29C 64/241; B29C 64/35; B29C 64/268; B29C 64/153; B33Y 10/00; B33Y 30/00; B33Y 40/00
See application file for complete search history.

(56) References Cited

U.S. PATENT DOCUMENTS

| | | | |
|---|---|---|---|
| 2016/0067923 A1 | 3/2016 | James et al. | |
| 2016/0279871 A1* | 9/2016 | Heugel | B22F 3/1055 |
| 2017/0036401 A1 | 2/2017 | Donovan et al. | |

* cited by examiner

*Primary Examiner* — Joseph S Del Sole
*Assistant Examiner* — John Robitaille
(74) *Attorney, Agent, or Firm* — McNees Wallace & Nurick LLC

(57) ABSTRACT

An additive manufacturing apparatus includes an energy beam source adapted to emit an energy beam, and a component building area including a base extendable between and vertically movable relative to opposed walls. The component building area includes a platform supported by the base and extendable between the walls, the platform having a layer onto which powdered material is applied, the powdered material being melted or sintered by the energy beam to form a component. The component building area includes an articulation device for rotating the platform about a horizontal axis, and a powder recovery arrangement. The apparatus includes subsequent to formation of the component, the articulation device rotating the platform about the horizontal axis for collecting loose powder by the powder recovery arrangement by virtue of gravity.

20 Claims, 6 Drawing Sheets

(51) Int. Cl.
*B29C 64/153* (2017.01)
*B29C 64/25* (2017.01)
*B22F 3/10* (2006.01)

ADDITIVE MANUFACTURING APPARATUS

FIELD OF THE INVENTION

The present invention is directed to additive manufacturing apparatus. More particularly, the present invention is directed to additive manufacturing apparatus and method for operating manufacturing apparatus forming components from powder material.

BACKGROUND OF THE INVENTION

Additive manufacturing apparatus, such as direct metal laser melting (DMLM) are utilized to form components for use in many applications. Many additive manufacturing apparatus utilize a laser beam to melt or sinter sequentially arranged layers of the powder material to form such components. However, there are challenges associated with unloading the newly formed components, which must occur prior to forming the next batch of components.

For example, loose powder material must be collected from the component building area of the apparatus. Conventional additive manufacturing apparatus typically require operators to open the apparatus to manually remove the loose powder material, which is time-consuming. Moreover, some powder materials may be harmful to the operator, requiring protective gear, which adds further expense to the process, and opening the apparatus may result in contamination of the powder material, which must be reconditioned before it can be reintroduced into the apparatus for forming additional components.

BRIEF DESCRIPTION OF THE INVENTION

In an exemplary embodiment, an additive manufacturing apparatus includes an energy beam source adapted to emit an energy beam, and a component building area including a base extendable between and vertically movable relative to opposed walls. The component building area includes a platform supported by the base and extendable between the walls, the platform having a layer onto which powdered material is applied, the powdered material being melted or sintered by the energy beam to form a component. The component building area includes an articulation device for rotating the platform about a horizontal axis, and a powder recovery arrangement. The apparatus includes subsequent to formation of the component, the articulation device rotating the platform about the horizontal axis for collecting loose powder by the powder recovery arrangement by virtue of gravity.

In another exemplary embodiment, a kit for an additive manufacturing apparatus includes an energy beam source adapted to emit an energy beam and a component building area comprising a base extendable between and vertically movable relative to opposed walls. The component building area includes a platform supportable by the base and extendable between the walls, the platform having a layer onto which powdered material is appliable, the powdered material being melted or sintered by the energy beam to form a component, an articulation device for rotating the platform about a horizontal axis, and a frame positionable between the energy beam source and the component building area for guiding loose powder from the component building area toward a powder recovery arrangement. The kit including subsequent to formation of the component, the articulation device rotating the platform about the horizontal axis for collecting the loose powder by the powder recovery arrangement by virtue of gravity.

In a further exemplary embodiment, a method for operating an additive manufacturing apparatus including an energy beam source adapted to emit an energy beam and a component building area including a base extendable between and vertically movable relative to opposed walls, including forming a component in the component building area on a platform supported by the base and extendable between the walls, the platform having a layer onto which powdered material is applied, the powdered material being melted or sintered by the energy beam to form the component. The method further includes rotating the platform about a horizontal axis, and collecting loose powder by virtue of gravity.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary additive manufacturing apparatus. Embodiments of the present disclosure, in comparison to additive manufacturing apparatus not utilizing one or more features disclosed herein, decrease component cycle time, decrease operating costs, improve operator working conditions, decrease risk of powder material contamination, or combinations thereof.

Figure 1:
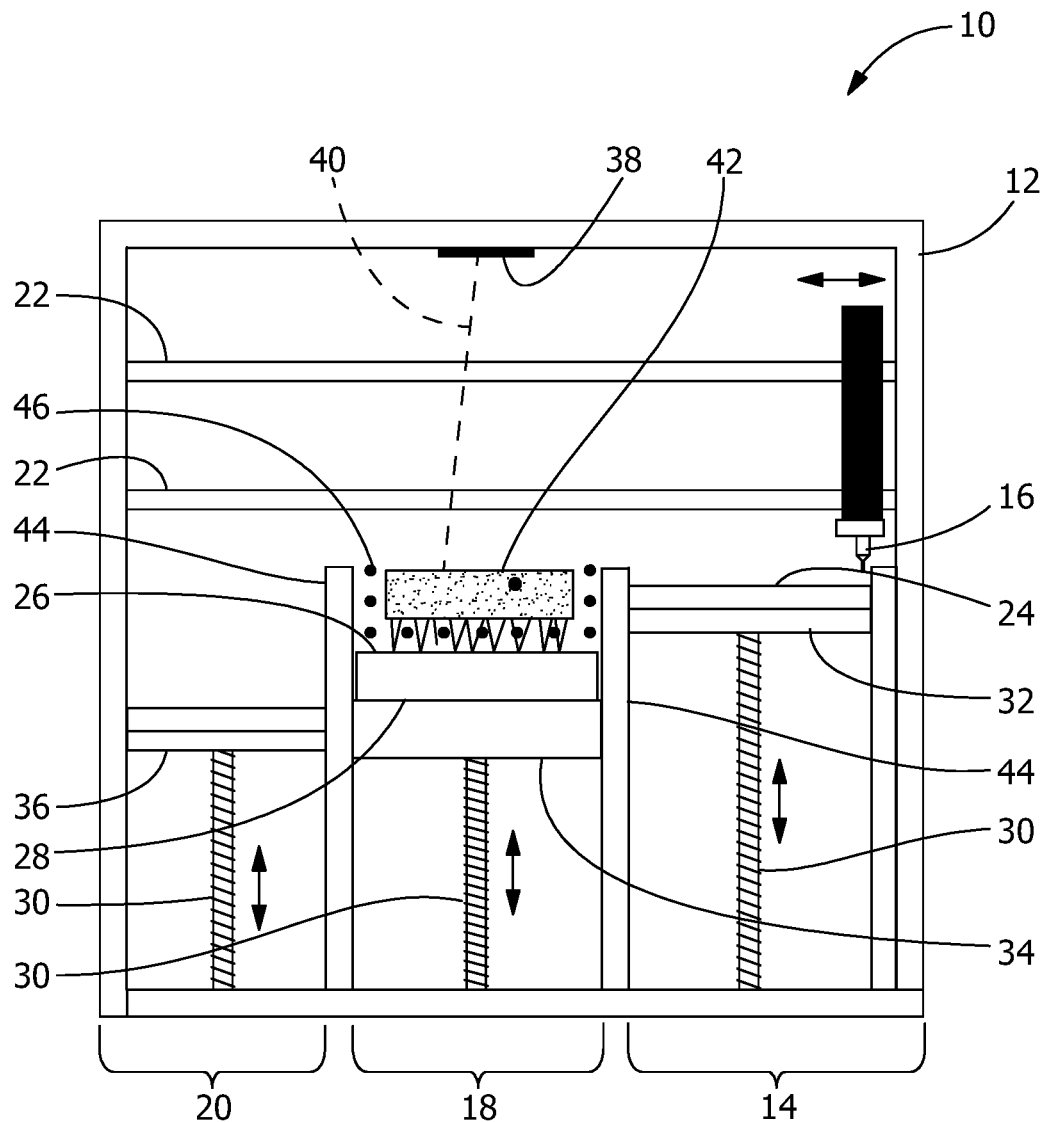
FIG. 1 is a front view of a prior art additive manufacturing apparatus.

Referring to FIG. 1, a prior art additive manufacturing apparatus 10 includes an enclosure or operating envelope 12 containing a powder dispenser area or powder dispenser container/volume 14, a component building area 18, and a powder recovery arrangement 20. A typical manufacturing apparatus layout/architecture for medium size DMLM machines like Model 290 manufactured by Electro Optical Systems (EOS) or M2, M1 models manufactured by Concept Laser. Component building area 18 includes opposed walls 44 Operating envelope 12 includes guides 22 for carrying a powder recoater 16 between powder dispenser container/volume 14 and component building area 18. Powder recoater 16 applies a uniform layer of powdered material 24 from powder dispenser area or container/volume 14 over a layer 26 of a platform 28, which platform 28 extending between opposed walls 44 of component building area 18. Each of powder dispenser container/volume 14, component building area 18, and powder recovery arrangement 20 include a vertical adjustment device 30 for selectively raising and lowering respective bases 32, 34, 36. Base 34 is non-rotatable relative to opposed walls 44. Once a uniform layer of powdered material 24 is applied over layer 26 of platform 28, an energy beam source 38, such as a laser, emits an energy beam 40, selectively melting or sintering portions of the powder material on layer 26. Successive layers of powdered material 24 are applied over layer 26 of platform 28, with portions of the successive layers of powder material subsequently melted or sintered over layer 26, forming one or more components 42. Once component 42 is formed, an operator (not shown) must access the operating envelope 12 of the apparatus to manually remove loose powder 46 surrounding component 42, such as moving the loose powder toward powder recovery arrangement 20 before the next batch of components may be formed. Shortcomings/disadvantages associated with such loose powder removal are previously discussed above.

It is to be understood that powdered material may include metal powder, ceramic powder, plastic powder, or a combination thereof.

Figure 2:
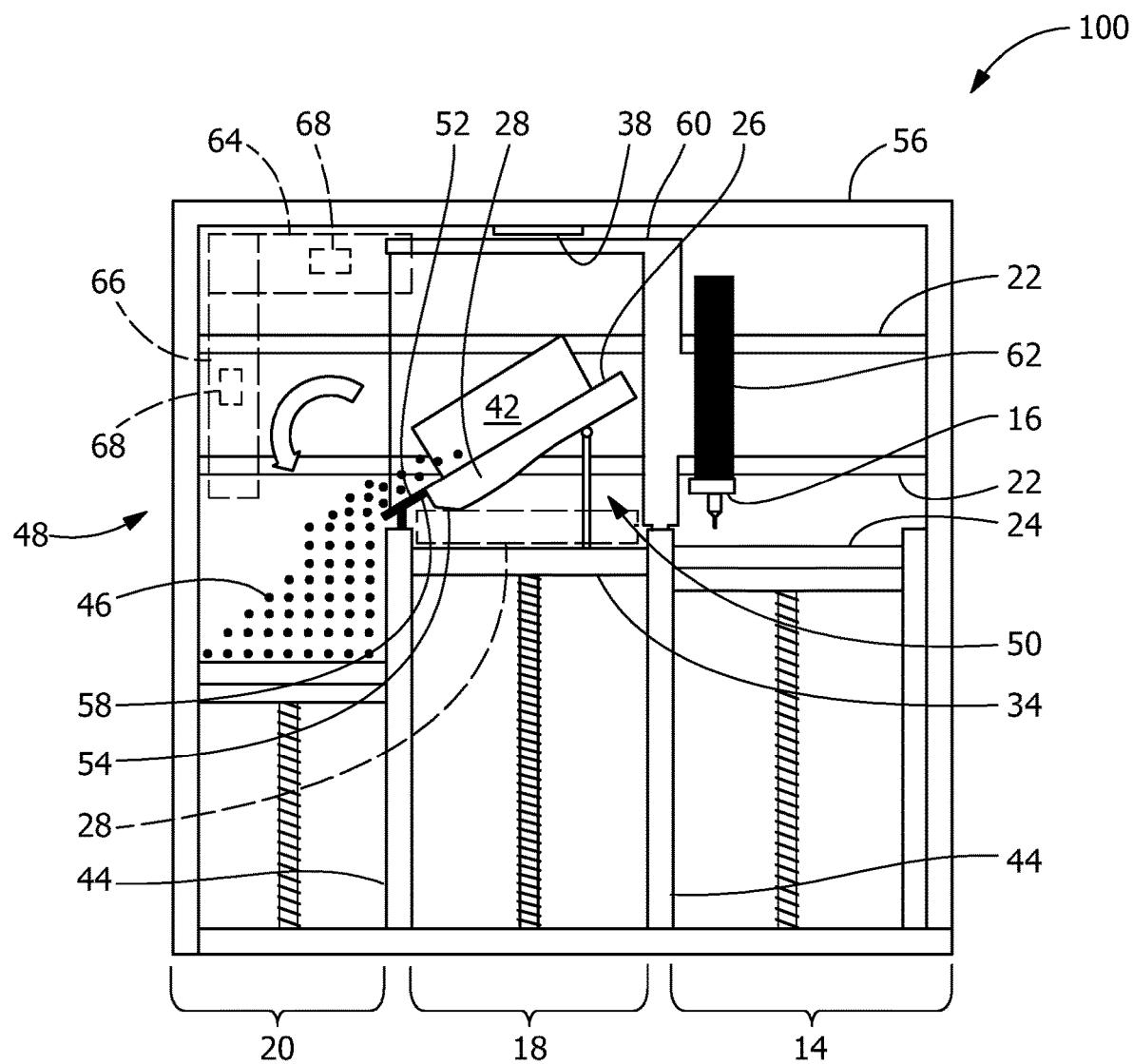
FIG. 2 is a front view of an exemplary additive manufacturing apparatus, according to the present disclosure.

As shown in FIG. 2, an improved additive manufacturing apparatus 100 is now discussed. In one embodiment, additive manufacturing apparatus 100 is achieved by a retrofit kit or kit 48 installed in additive manufacturing apparatus 10. In one embodiment, additive manufacturing apparatus 100 is a newly constructed apparatus. For convenience and brevity, similar components previously discussed for additive manufacturing apparatus 10 are not repeated herein. As shown, additive manufacturing apparatus 100 includes an articulation device 50 for rotating platform 28 about a horizontal axis 52 subsequent to formation of component 42, permitting collection of loose powder 46 by powder recovery arrangement 20 by virtue of gravity. As further shown in FIG. 2, the rotational horizontal axis 52 is positioned at one end of platform 28. Depending upon the magnitude of the angle of rotation about horizontal axis 52, as well as the geometry and orientation of component(s) 42 relative to the platform, a significant majority of the loose powder 46 remaining in component building area 18 after formation of the component(s), typically 70 to 80 percent of the loose powder, or more, is collected in powder recovery arrangement 20. Depending upon the size, geometry, and orientation of component(s) 42, magnitude of the angle of rotation 55 (FIG. 13) about horizontal axis 52 may vary from an angle of less than 90 degrees to more than 180 degrees from a non-rotated position of platform 28 (i.e., layer 26 defining a horizontal plane in the non-rotated position). In one embodiment, subsequent to formation of component 42, the rotation of platform 28 may be performed automatically by a controller (not shown) of the apparatus in a known manner. In one embodiment, platform 28 includes a height maximization feature 54, such as a rounded edge or a chamfer formed along a lower edge of platform 28 for minimizing vertical elevation increase of the platform relative to base 34 during angular rotation of the platform about horizontal axis 52. Stated another way, height maximization feature 54 permits platform 28 to be rotated about horizontal axis 52 while requiring only minimum vertical separation, which includes, in one embodiment, zero vertical separation, from base 34. Height maximization feature 54 permits the accommodation of larger components 42 to be rotated, the size of such larger components 42 generally being limited by the largest arc traced by the periphery of the component during rotation about horizontal axis 52 that does not contact a top 56 of the enclosure or operating envelope 12 of the additive manufacturing apparatus.

Figure 13:
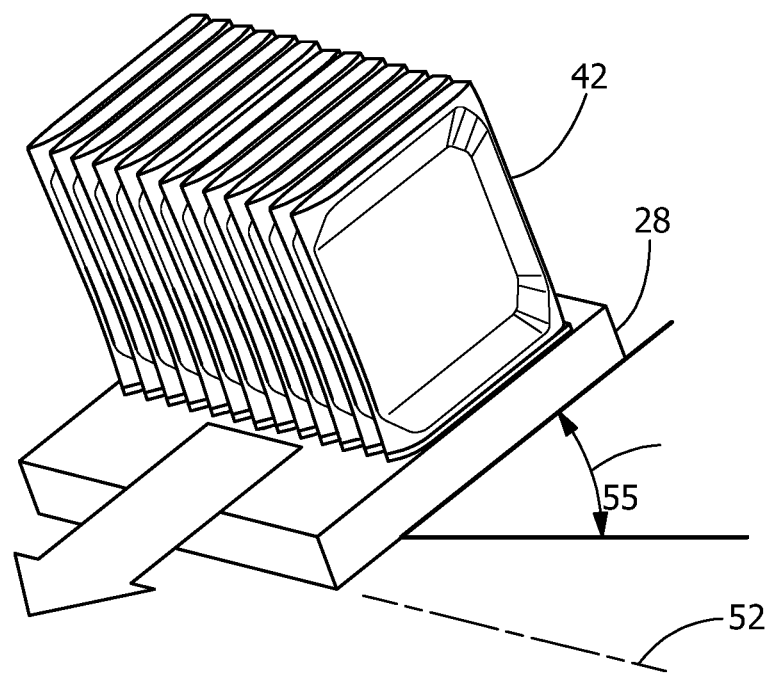
FIG. 13 is an exemplary embodiment of components from a component building area taken from a region 13 of FIG. 12, according to an embodiment of the present disclosure.

As further shown in FIG. 2, additive manufacturing apparatus 100 includes a powder guide 58 extending between component building area 18 and powder recovery arrangement 20 for guiding loose powder 46 from component building area 18 toward powder recovery arrangement 20. In one embodiment, powder guide is removably positioned at the top of wall 44 separating component building area 18 from powder recovery arrangement 20. In one embodiment, powder guide 58 is generally T-shaped. In one embodiment, powder guide 58 is rigid. In one embodiment, at least a portion of powder guide 58 is flexible. That is, a flexible powder guide 58 can guide loose powder 46 from component building area 18 toward powder recovery arrangement 20 over a range of angular rotation angles 55 (FIG. 13). In one embodiment, powder guide 58 selectively extends from platform 28, such as by being partially retractable inside or below platform 28. In one embodiment, powder guide 58 may be rotated relative to platform 28, such as being rotated out of the way during the formation of component 42, such as by a rotation source such as a motor located inside or below platform 28 or other convenient or appropriate location, and then being rotated into a position permitting the powder guide to guide loose powder 46 from component building area 18 toward powder recovery arrangement 20 subsequent to the formation of component 42. In one embodiment, powder guide 58 is selectively removable from any component associated with component building area, such as wall 44 or platform 28.

As further shown in FIG. 2, additive manufacturing apparatus 100 includes a frame 60 that is positionable between energy beam source 38 and component building area 18 for guiding loose powder 46 from component building area 18 toward powder recovery arrangement 20. In one embodiment, frame 60 is cuboid. Frame 60 is positioned and disposed to protect energy beam source 38 from loose powder 46 during collection of the loose powder. In one embodiment, frame 60 may include a connection feature 62 for selectively securing frame 60 to powder recoater 16, such that powder recoater 16 positions frame 60 over component building area 18 subsequent to formation of component 42 for guiding loose powder 46 from component building area 18 toward powder recovery arrangement 20. In one embodiment, frame 60 is expandable/collapsible, and shown in exemplary collapsed positions 64, 66. For example, portions of frame 60 may telescopingly expand or collapse, or pivotably rotate relative to one another, or a combination thereof, such as a result of actuation of one or more motors 68, although any number of different arrangements may be utilized. As a result of one or more of these arrangements, frame 60 may remain inside of enclosure or operating envelope 12 of the apparatus 100, providing improved operator working conditions due to the apparatus remaining in a sealed environment relative to the operator, as well as reducing the risk of contamination of loose powder 46. In one embodiment, frame 60 is rigid. In one embodiment, frame 60 is removable from the enclosure or operating envelope 12 of the apparatus 100.

Figure 3:
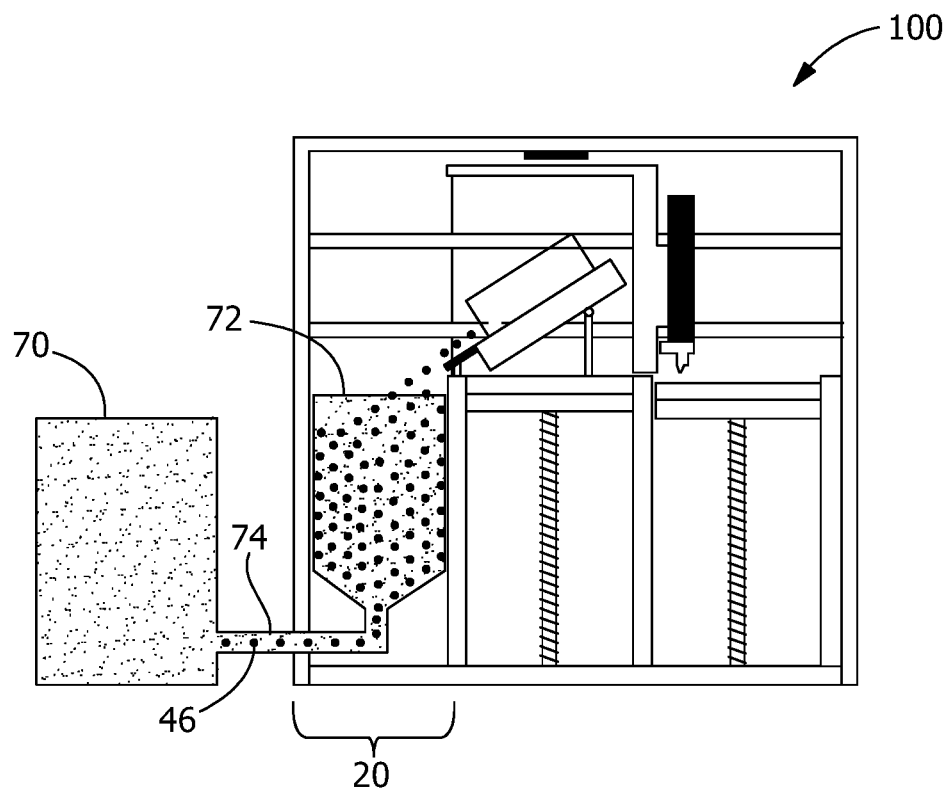
FIG. 3 is a front view of an exemplary additive manufacturing apparatus, according to the present disclosure.

As shown in FIGS. 3-5, 6A, 6B, 7, 8A and 8B, powder recovery arrangement 20 is now discussed. For example, as shown in FIG. 3, powder recovery arrangement 20 includes a suitable cyclone vacuum cleaning device 70, such as a vacuum device that draws loose powder 46 from a collection vessel or container 72 positioned exterior of enclosure or operating envelope 12 of additive manufacturing apparatus 100. As further shown in FIG. 3, a conduit 74 is in fluid communication with the vacuum cleaning device 70 and a lower portion of the collection container 72. Vacuum cleaning device 70 permits collection of loose powder 46 in a sealed environment relative to the operator, providing advantages such as those previously discussed.

Figure 4:
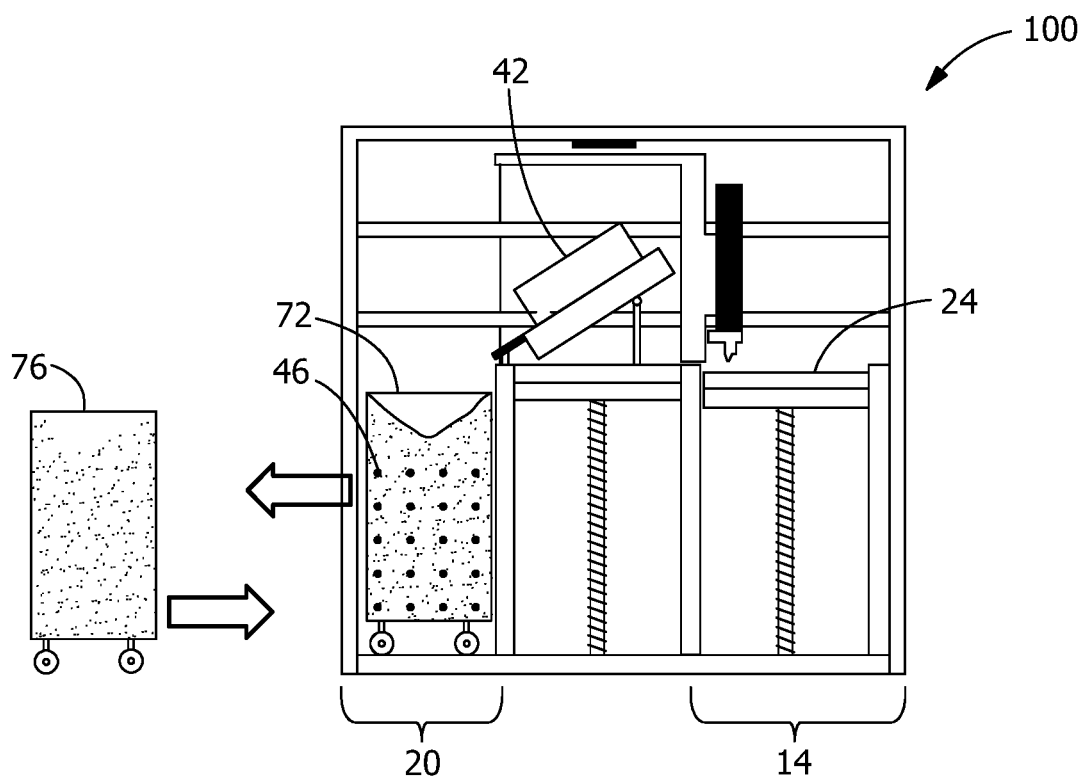
FIG. 4 is a front view of an exemplary additive manufacturing apparatus, according to the present disclosure.

FIG. 4 shows an exemplary embodiment of powder recovery arrangement 20, in which an empty vessel or container 76 may be used to replace container 72 after loose powder 46 has been collected in container 72. Such an arrangement may be advantageous, for example, when there is sufficient powdered material 24 remaining in powder dispenser container/volume 14 for forming a subsequent batch of components 42, thereby permitting the loose powder 46 to be reconditioned for subsequent usage in additive manufacturing apparatus 100 while the subsequent batch of components is being formed.

Figure 5:
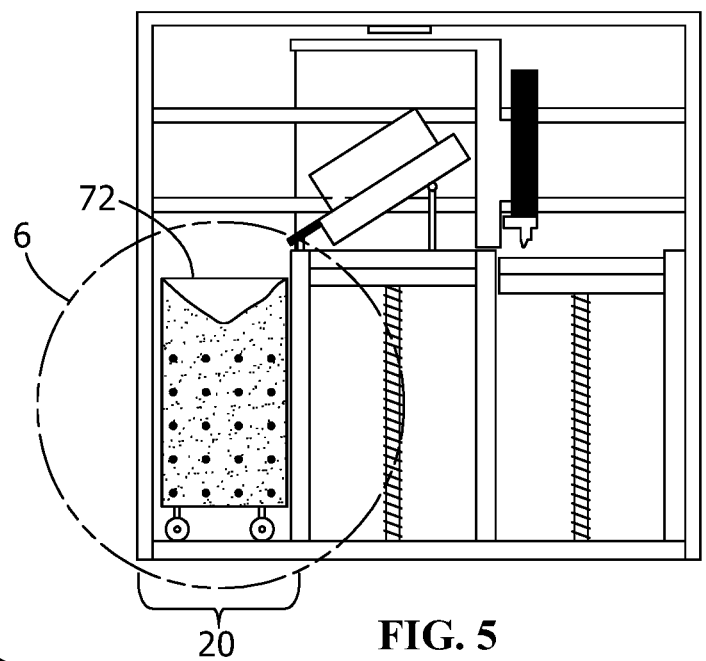
FIG. 5 is a front view of an exemplary additive manufacturing apparatus, according to the present disclosure.
Figure 6A:
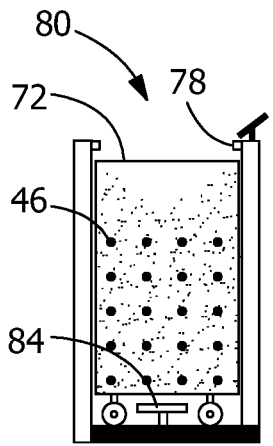
FIG. 6A is an exemplary embodiment of a powder recovery arrangement in a retracted position taken from a region 6 of FIG. 5, according to the present disclosure.
Figure 6B:
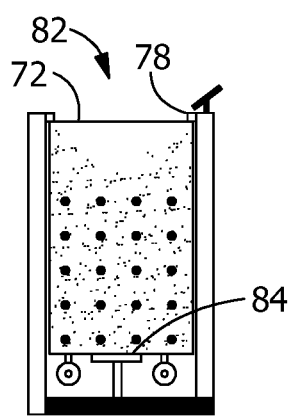
FIG. 6B is the powder recovery arrangement of FIG. 6A in an extended position, according to the present disclosure.
Figure 7:
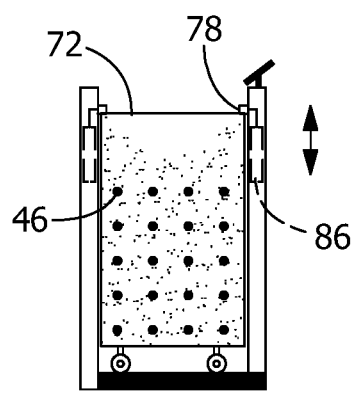
FIG. 7 is an exemplary embodiment of a pot recovery arrangement taken from a region 6 of FIG. 5, according to the present disclosure.
Figure 8A:
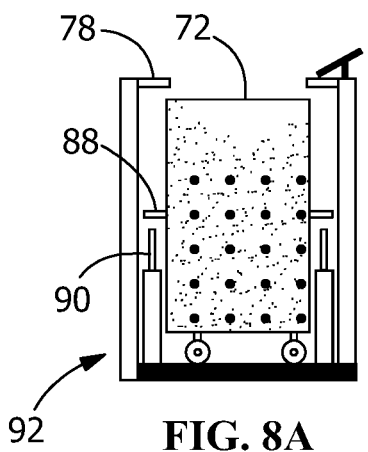
FIG. 8A is an exemplary embodiment of a powder recovery arrangement in a retracted position taken from a region 6 of FIG. 5, according to the present disclosure.
Figure 8B:
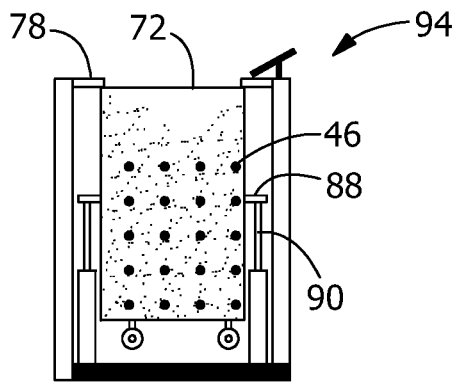
FIG. 8B the powder recovery arrangement of FIG. 8A in an extended position, according to the present disclosure.

Each of FIGS. 6A and 6B, FIG. 7, and FIGS. 8A, and 8B show an exemplary embodiment of a powder recovery arrangement 20 taken from a region 6 of FIG. 5 of additive manufacturing apparatus 100. As shown in FIGS. 6A and 6B, an actuator 84 is actuated between a recessed or retracted position 80 (FIG. 6A) and an extended position 82 (FIG. 6B) for selectively moving container 72 relative to a seal 78. That is, at least during or prior to the rotation of platform 28 (FIG. 2), actuator 84 is actuated toward extended position 82, thereby forming a sealed arrangement between the seal and container 72 such that loose powder 46 is substantially prevented from inadvertently falling between seal 78 and container 72. As shown in FIG. 7, one or more actuators 85 selectively actuates seal 78 relative to container 72 in movement direction 86 for forming a sealed arrangement, or an unsealed arrangement, between container 72 and seal 78. Similarly, as shown in FIGS. 8A and 8B, container 72 includes tabs 88 extending laterally outward. Similarly, in response to actuators 90 being selectively actuated from a retracted position 92 (FIG. 8A) toward an extended position 94 (FIG. 8B), a sealed arrangement between seal 78 and container 72 is formed. Other arrangements for moving the container relative to the seal may be used.

Figure 9:
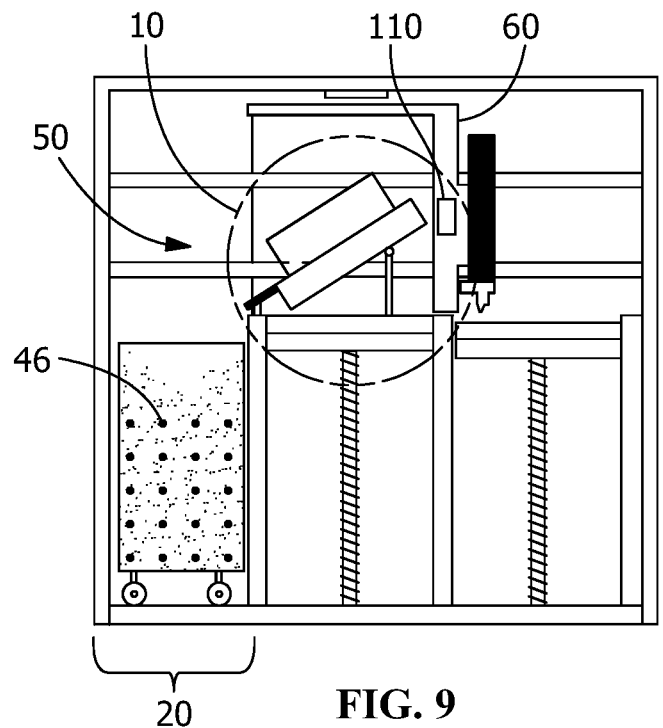
FIG. 9 is a front view of an exemplary additive manufacturing apparatus, according to the present disclosure.
Figure 10A:
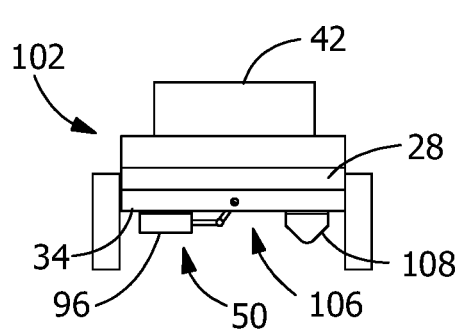
FIG. 10A is an exemplary embodiment of a portion of a component building area positioned in a retracted position and taken from a region 10 of FIG. 9, according to the present disclosure.
Figure 10B:
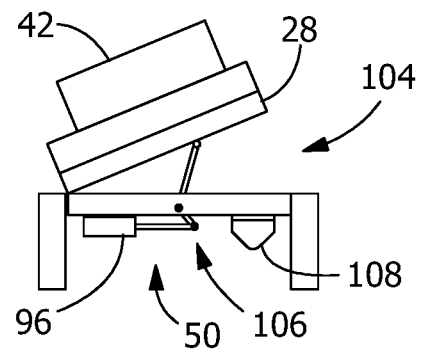
FIG. 10B is the portion of the component building area of FIG. 10A in an extended position, according to the present disclosure.
Figure 11A:
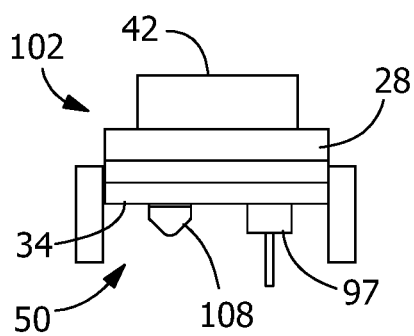
FIG. 11A is an exemplary embodiment of a portion of a component building area positioned in a retracted position and taken from a region 10 of FIG. 9, according to the present disclosure.
Figure 11B:
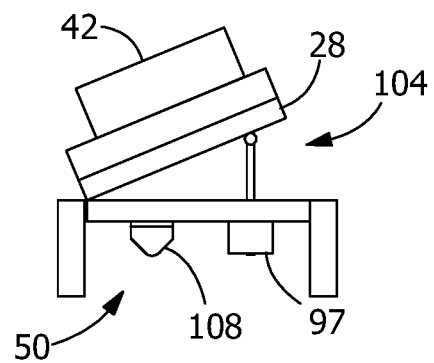
FIG. 11B is the portion of the component building area of FIG. 11A in an extended position, according to the present disclosure.

Each of FIGS. 10A and 10B, and FIGS. 11A and 11B show an exemplary embodiment of an articulation device 50 taken from a region 10 of FIG. 9 of additive manufacturing apparatus 100. As shown in FIGS. 10A and 10B, articulation device 50 includes an actuator 96 operatively connected to a mechanical linkage 106 for rotating platform 28 and component 42 between a non-rotated position 102 (FIG. 10A) and a rotated position 104 (FIG. 10B) for collecting loose powder 46 (FIG. 9) by powder recovery arrangement 20 (FIG. 9). As shown in FIGS. 11A and 11B, articulation device 50 includes a linear actuator 97 pivotably connected to platform 28 for rotating platform 28 and component 42 between a non-rotated position 102 (FIG. 11A) and a rotated position 104 (FIG. 11B) for collecting loose powder 46 (FIG. 9) by powder recovery arrangement 20 (FIG. 9). Optionally, articulation device 50 includes a powder removal feature 108, such as at least one of a vibration device and/or operatively connected to base 34 (FIG. 10A) and/or platform 28, and/or at least one pressurized gas source 110 (FIG. 9), operatively connected, for example, to frame 60, although in one embodiment, the pressurized gas source can be operatively connected to one or more of platform 28 and base 34 (FIG. 10A).

Figure 12:
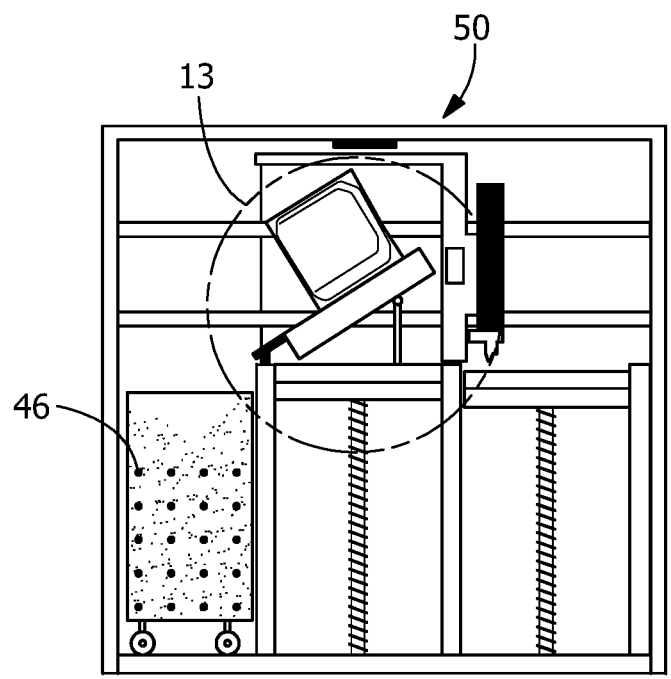
FIG. 12 is a front view of an exemplary additive manufacturing apparatus, according to the present disclosure.

FIG. 13 shows an exemplary embodiment of an articulation device 50 taken from a region 13 of FIG. 12 of additive manufacturing apparatus 100, in which components 42, such as shrouds, may be arranged to advantageously facilitate removal of loose powder 46 (FIG. 12) surrounding the components as a result of rotation of platform 28 and components 42 about horizontal axis 52 as previously discussed.

It is to be understood that FIG. 2 shows a kit 48 for an additive manufacturing apparatus 100 comprising an energy beam source 38 adapted to emit an energy beam 40 and a component building area 18 comprising a base 34 extendable between and vertically movable relative to opposed walls 44, comprises a platform 28 supportable by the base 34 and extendable between the walls 44, the platform 28 having a layer 26 onto which powdered material 24 is appliable, the powdered material 24 being melted or sintered by the energy beam 40 to form a component 42. The kit 48 further includes an articulation device 50 for rotating the platform 28 about a horizontal axis 52. The kit 48 further includes a frame 60 positionable between the energy beam source 38 and the component building area 18 for guiding loose powder 46 from the component building area 18 toward a powder recovery arrangement 20, wherein subsequent to formation of the component 42, the articulation device 50 rotating the platform 28 about the horizontal axis 52 for collecting the loose powder 46 by the powder recovery arrangement 20 by virtue of gravity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An additive manufacturing apparatus comprising:
   an energy beam source adapted to emit an energy beam;
   a component building area comprising:
      a base extendable between and vertically movable relative to opposed walls;
      a platform supported by the base and extendable between the walls, the platform having a layer onto which powdered material is applied, the powdered material being melted or sintered by the energy beam to form a component; and
      an articulation device for rotating the platform about a horizontal axis; and
      a powder recovery arrangement;
   wherein subsequent to formation of the component, the articulation device rotates the platform about the horizontal axis for collecting loose powder by the powder recovery arrangement by virtue of gravity.

2. The additive manufacturing apparatus of claim 1, wherein the articulation device is adapted for rotating the platform about one end of the platform.

3. The additive manufacturing apparatus of claim 1, wherein the base is non-rotatable relative to the opposed walls.

4. The additive manufacturing apparatus of claim 1 further comprises a frame positionable between the energy beam source and the component building area for guiding the loose powder from the component building area toward the powder recovery arrangement.

5. The additive manufacturing apparatus of claim 4, wherein the frame is expandable/collapsible.

6. The additive manufacturing apparatus of claim 4, wherein the frame remains inside of an operating envelope of the additive manufacturing apparatus.

7. The additive manufacturing apparatus of claim 1, wherein the platform includes a height maximization feature.

8. The additive manufacturing apparatus of claim 1 further comprises a powder guide extending between the component building area and the powder recovery arrangement for guiding the loose powder from the component building area toward the powder recovery arrangement.

9. The additive manufacturing apparatus of claim 8, wherein at least a portion of the powder guide is flexible.

10. The additive manufacturing apparatus of claim 8, wherein the powder guide is removably positioned at the top of the wall separating the component building area and the powder recovery arrangement.

11. The additive manufacturing apparatus of claim 8, wherein the powder guide selectively extends from the platform.

12. The additive manufacturing apparatus of claim 8, wherein the powder guide rotates relative to the platform.

13. The additive manufacturing apparatus of claim 1, wherein the powder recovery arrangement includes a vacuum device for removing the loose powder.

14. The additive manufacturing apparatus of claim 1, wherein the powder recovery arrangement includes a container selectively movable relative to a seal.

15. The additive manufacturing apparatus of claim 1, wherein the articulation device includes an actuator.

16. The additive manufacturing apparatus of claim 15, wherein the actuator is a linear actuator.

17. The additive manufacturing apparatus of claim 15, wherein the articulation device includes a mechanical linkage.

18. The additive manufacturing apparatus of claim 1, wherein the articulation device includes at least one of a vibration device, an ultrasonic device, and a pressurized gas source.

19. A kit for an additive manufacturing apparatus having an energy beam source adapted to emit an energy beam and a component building area having a base extendable between and vertically movable relative to opposed walls, the kit comprising:
   a platform supportable by the base and extendable between the walls, the platform having a layer onto which powdered material is applied, the powdered material being melted or sintered by the energy beam to form a component;
   an articulation device for rotating the platform about a horizontal axis while the platform is disposed within the component building area; and
   a frame positionable between the energy beam source and the component building area for guiding loose powder from the component building area toward a powder recovery arrangement,
   wherein subsequent to formation of the component, the articulation device rotates the platform about the horizontal axis for collecting the loose powder by the powder recovery arrangement by virtue of gravity.

20. A method for operating an additive manufacturing apparatus having an energy beam source adapted to emit an energy beam and a component building area having a base extendable between and vertically movable relative to opposed walls, the method comprising:
   forming a component in the component building area on a platform supported by the base and extendable between the walls, the platform having a layer onto which powdered material is applied, the powdered material being melted or sintered by the energy beam to form the component; and
   subsequent to formation of the component, articulating an articulation device for rotating the platform about a horizontal axis while the platform is disposed within the component building area so as to rotate the platform about the horizontal axis and collect loose powder by virtue of gravity with a powder recovery arrangement.

* * * * *